United States Patent [19]

Abe et al.

[11] Patent Number: 5,019,001
[45] Date of Patent: May 28, 1991

[54] METHOD FOR MANUFACTURING LIQUID CRYSTAL DISPLAY DEVICE

[75] Inventors: Masanori Abe; Yoshiaki Komatsubara; Tsuyoshi Iyama, all of Hyogo, Japan

[73] Assignee: Kabushiki Kaisha Toshiba, Kawasaki, Japan

[21] Appl. No.: 453,802

[22] Filed: Dec. 20, 1989

[30] Foreign Application Priority Data

Dec. 21, 1988 [JP] Japan .................................. 63-322565

[51] Int. Cl.⁵ ................................................ G09G 3/22
[52] U.S. Cl. ........................................... 445/3; 445/24; 437/8
[58] Field of Search ..................... 445/3, 24, 25; 437/8

[56] References Cited

U.S. PATENT DOCUMENTS 4,296,372  10/1981  Feuerbaum ........................ 437/8 X
4,455,739  6/1984  Hynecek ............................ 437/8 X
4,820,222  4/1989  Holmberg et al. ................. 437/8 X

*Primary Examiner*—Kenneth J. Ramsey
*Attorney, Agent, or Firm*—Cushman, Darby & Cushman

[57] ABSTRACT

In a method for manufacturing a liquid crystal display device, address and data lines are provided over a substrate, and a short-circuit area and an area to be made short-circuit are provided to cause short-circuiting between the address and data lines. It is prevented a TFT array from dielectric breakdown by static electricity in manufacturing processes, and examination is made for a connection breakage, and short-circuiting, at a TFT array for the liquid crystal display device, prior to the manufacturing step by cutting the short-circuit. Moreover, it can be presented from dielectric breakdown by static electricity in later processes to short the area to be made short-circuit after the examination. It is possible to both decrease a faults percentage of liquid crystal devices and improve their productivity.

7 Claims, 6 Drawing Sheets

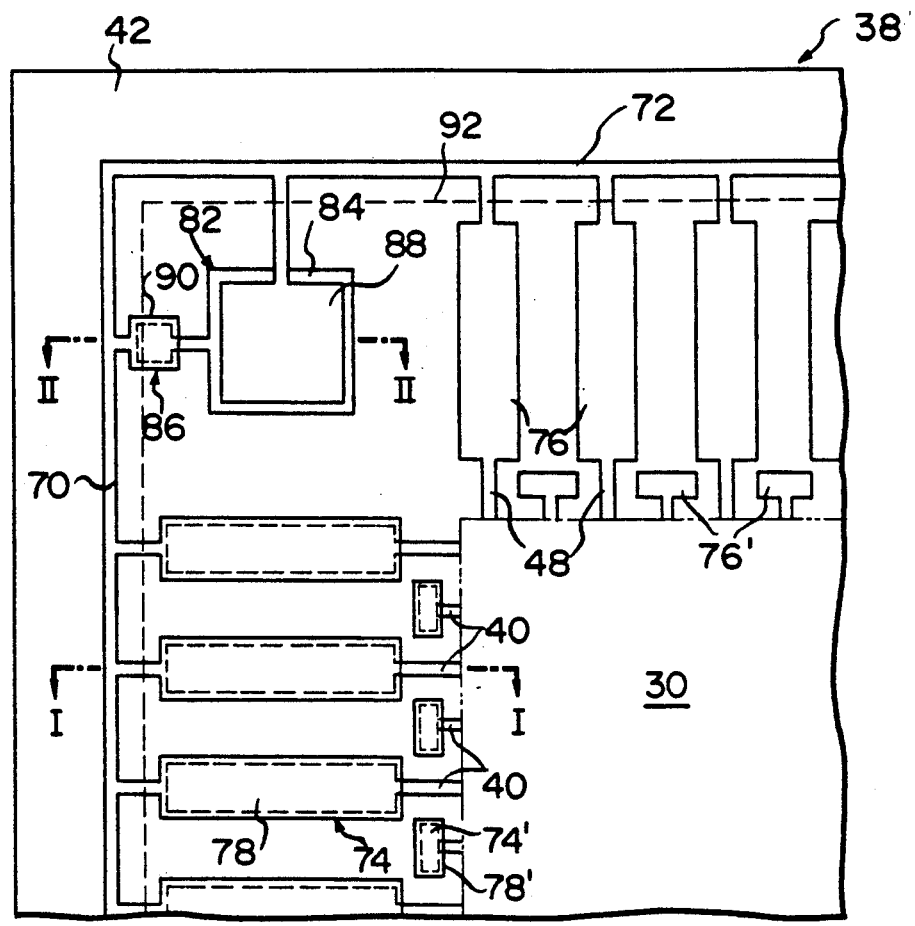
F I G. 3
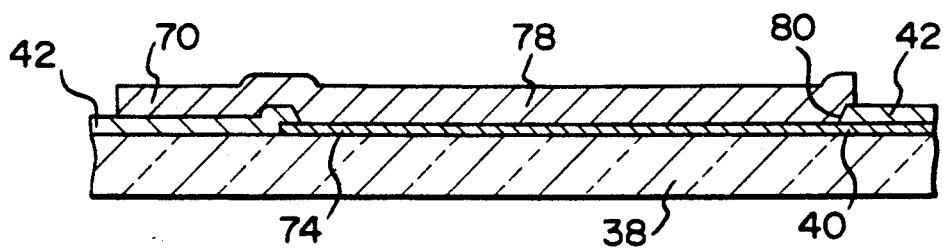
F I G. 4
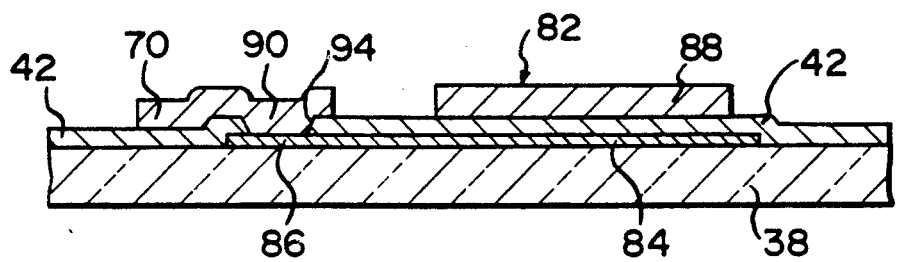
F I G. 5

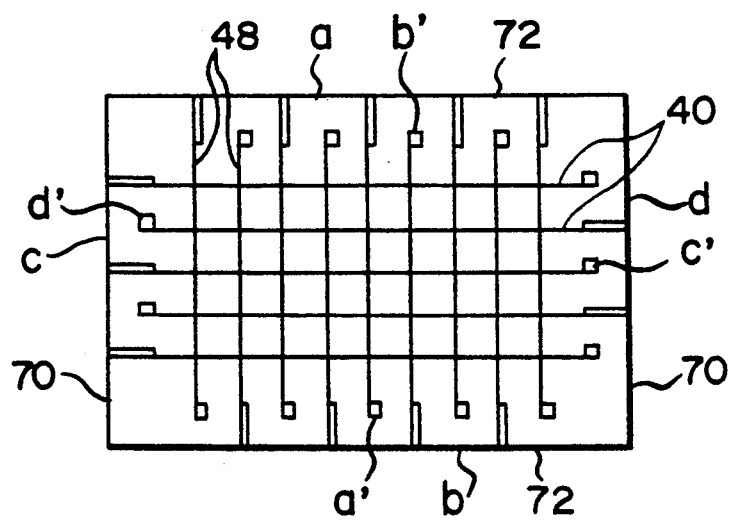
F I G. 6
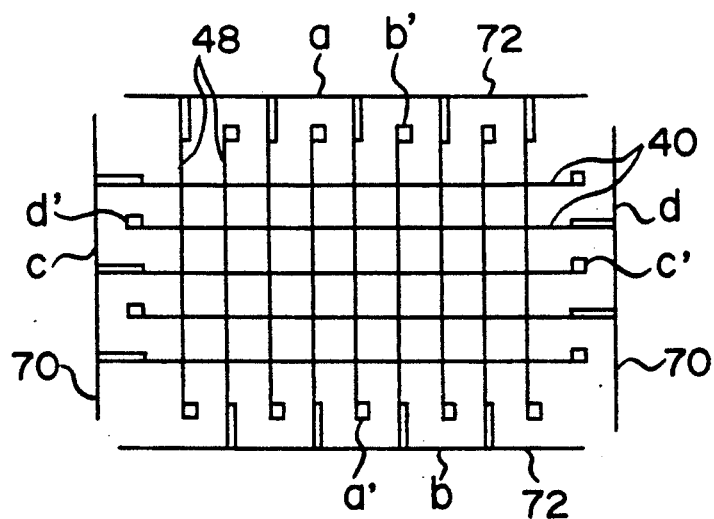
F I G. 7

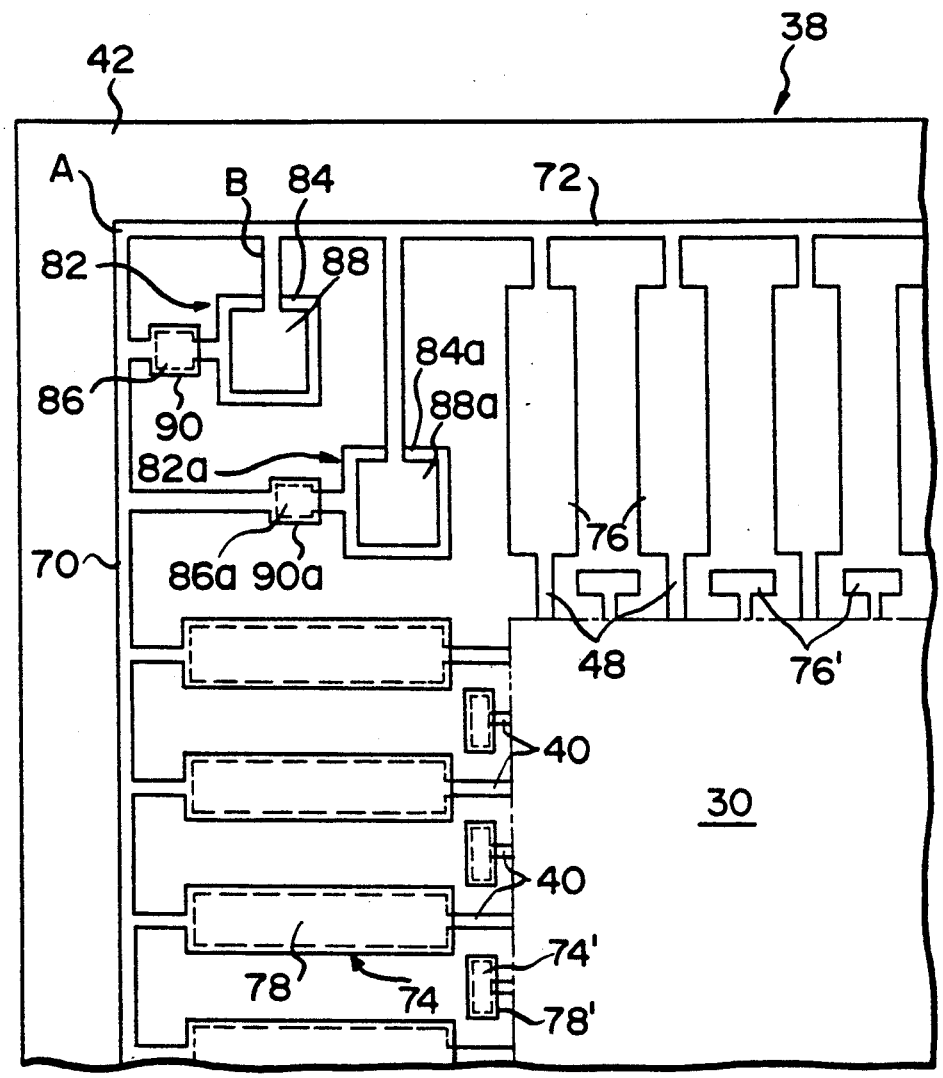
F I G. 8

METHOD FOR MANUFACTURING LIQUID CRYSTAL DISPLAY DEVICE

BACKGROUND OF THE INVENTION

1. Field of the Invention

The Present invention relates to a method for manufacturing a liquid crystal (LC) display device and, in particular, to a method for manufacturing an active matrix type liquid crystal display device.

2. Description of the Related Art

An active matrix type liquid crystal display device includes active elements, such as TFT (Thin Film Transistor) and MIM (Metal Insulator Metal), to drive and control respective pixels. A liquid crystal display device having, for example, a TFT array will be explained below.

The liquid crystal display device includes first and second substrates and a liquid crystal sealed between these substrates. The first substrate includes a transparent substrate, made of ex. glass, and many address and data lines formed, in an intersecting fashion, over the transparent substrate with an insulating film formed therebetween. At the crosspoint of the address and data lines, a gate electrode which is formed integral with the address line is formed, and a semiconductor layer is formed over an insulating layer on the gate electrode. Drain electrode integral with the data line and source electrode are formed over the semiconductor layer such that they are located opposite to each other. In this way, a TFT element is constructed as a nonlinear active element. A transparent pixel electrode is formed over the insulating film and connected to a source electrode. The semiconductor layer and drain and source electrodes are covered with an insulating protective film. An orientation film is formed over the whole surface of the protective film and transparent pixel electrode.

The second substrate is located opposite to the first substrate and includes a transparent substrate made of, for example, glass and a transparent electrode and orientation film sequentially formed over the substrate. In a color display type LC display device, a color filter is formed under the transparent electrode.

The first and second substrates are sealed at their marginal portions, defining a predetermined clearance into which a liquid crystal is sealed.

In the TFT element of the aforementioned liquid crystal display device, the film forminmg step and photoetching step are repeated a plurality of times to provide a gate electrode, insulating film, semiconductor layer and drain and source electrodes.

The LC display device including the TFT array sometimes encounters "line defects". The line defects occur due to a connection breakage at the address and data lines and due to the short-circuiting caused between these lines or the short-circuiting at a spot where both the layers contact. These phenomena are caused by dust and incomplete photoetching steps effected during the manufacturing process. The interlayer short-circuiting may also be caused by a destruction by static electricity. In order to prevent such a destruction, as shown in FIG. 1, respective address lines 2 and respective data lines 4 are shorted by short-circuit lines 6, 8 in the conventional device to make the upper and lower conductor layers with an insulating film interposed therebetween equal in potential to each other. This method is proved effective to static electricity, but is never effective to a connection breakage occurring by other causes, such as short-circuiting between the associated layers.

Further, a plurality of TFT's 10 are connected to address and data lines (signal lines) and, if signal lines are broken for some reason or other, the corresponding TFT fails due to no voltage being applied to the TFT by the connection breakage. In other words, TFT's which are situated at a location distant from the connection breakage site with a voltage supply section as a reference are not turned ON. The connection breakage becomes a fatal defect for image display or a similar defect is also encountered due to a leakage of a signal current if adjacent signal lines are short-circuited.

Since such defects, unavoidably, occur during the manufacture of the LC display device, it is, therefore, necessary to eliminate them, if possible, in the earlier stage of the manufacturing process. It is important that the defects be eliminated by making an examination for a connection breakage, or short-circuiting, in the layered substrate.

It is conventional practice to form electrode pads on the electrode connected across the respective signal line so that checking may be made for examination purposes. The examination is made for the resistance of all the signal lines, that is, for a connection breakage, with the use of electrode pads. This method often uses a probe card for an enhanced operation efficiency whereby it is possible to measure the resistances of the signal lines in units of several tens of signal lines. Preparing such a probe card requires a very high accuracy and, therefore, there is a restriction to the number of signal lines measurable all at one time. Further, it takes a considerable time to make such measurement and measured values vary due to a wear or an injury of the probe. It is, therefore, difficult to make a check for short-circuiting between the adjacent signal lines because the address and data lines are arranged, in an intersecting fashion, with the insulating film formed therebetween and, in this case, are short-circuited so as to prevent dielectric breakdown by static electricity.

SUMMARY OF THE INVENTION

It is accordingly the object of the present invention to provide a method which can prevent dielectric breakdown by static electricity and can positively check for a connection breakage, or short-circuiting, between signal lines at an earlier stage of a manufacturing process.

A method for manufacturing a liquid crystal display device, comprises the steps of:

(a) forming a plurality of address lines and a plurality of data lines, in an intersecting fashion, over a first substrate;

(b) forming a short-circuit line for short-circuiting the address and data lines;

(c) exposing, subsequent to forming the short-circuit line, a spot between the short-circuit lines of the address and data lines to a laser beam and cutting the short-circuit line;

(d) examining, subsequent to the cutting step, the presence or absence of a connection breakage and that of short-circuiting;

(e) forming a electrode on a second substrate; and (f) sealing a liquid crystal composition between the first and second substrates, wherein (g) the step (b) includes forming at least one area to be made short-circuit having two short-circuit electrodes connected to the short-circuit lines of the address and data lines, the two short-circuit electrodes being located opposite to each other with an insulating film formed therebetween, (h) subsequent to the step (d), the area to be made short-circuit is exposed to a laser beam to make short-circuiting between the two short-circuit electrodes; and (i) subsequent to making short-circuiting between the two short-circuit electrodes but prior to completing the liquid crystal display device, the short-circuit electrodes are cut off.

Since the address and data lines are short-circuited by the short-circuit line, it is possible to eliminate an influence exerted by static electricity over the device. It is possible to cut the short-circuit line so as to make an examination for a connection breakage and for short-circuiting between the associated layers and it is also possible to form the short-circuit line after the examination. Therefore, it is also possible to eliminate an influence exerted by static electricity over the device after the examination.

In the examination step, it desirable to examining for a connection breakage and short-circuiting of address and data lines as fast as possible. The arranging method of the address and data lines in examination step will be explained below. When an arrangement of the address and data lines is finished, the odd-and even-numbered terminals of the address and data lines are connected respectively. As a result, two electric lines are made. Moreover, the odd-and even-numbered address and data lines can be connected in series array, and it is possible to examine all the address lines and data lines, as a single lines. It is only necessary to examine the respective single line array. Examination is readily be made for a connection breakage and for short-circuiting.

According to the present invention, it is possible to eliminate an influence which is exerted by static electricity over the liquid crystal display element, and to perform an electrical examination in a short period of time. It is also possible to reduce a faults percentage, because the electrical examination is conducted at an earlier stage of the manufacturing process, and to largely increase the productivity of the liquid crystal display device.

BRIEF DESCRIPTION OF THE DRAWINGS

FIG. 3 is a partial plan view showing a liquid crystal display device according to the first embodiment of the present invention;

FIG. 4 is a cross-sectional view as taken along line I—I in FIG. 3;

FIG. 5 is a cross-sectional view as taken along line II—II in FIG. 3;

FIGS. 6 and 7 are views for explaining an examination made against a liquid crystal display device;

FIG. 8 is a partial plan view showing a liquid crystal display device according to a second embodiment of the present invention;

DETAILED DESCRIPTION OF THE PREFERRED EMBODIMENTS

Figure 1:
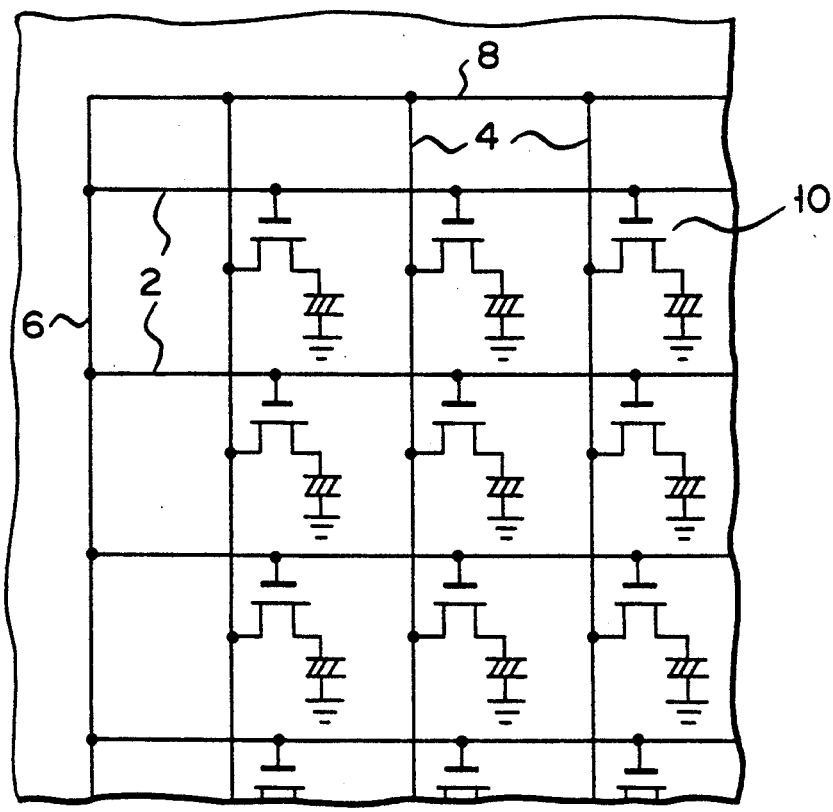
FIG. 1 is a circuit arrangement showing a state before a short-circuit spot is cut off in a conventional liquid display device.
Figure 2:
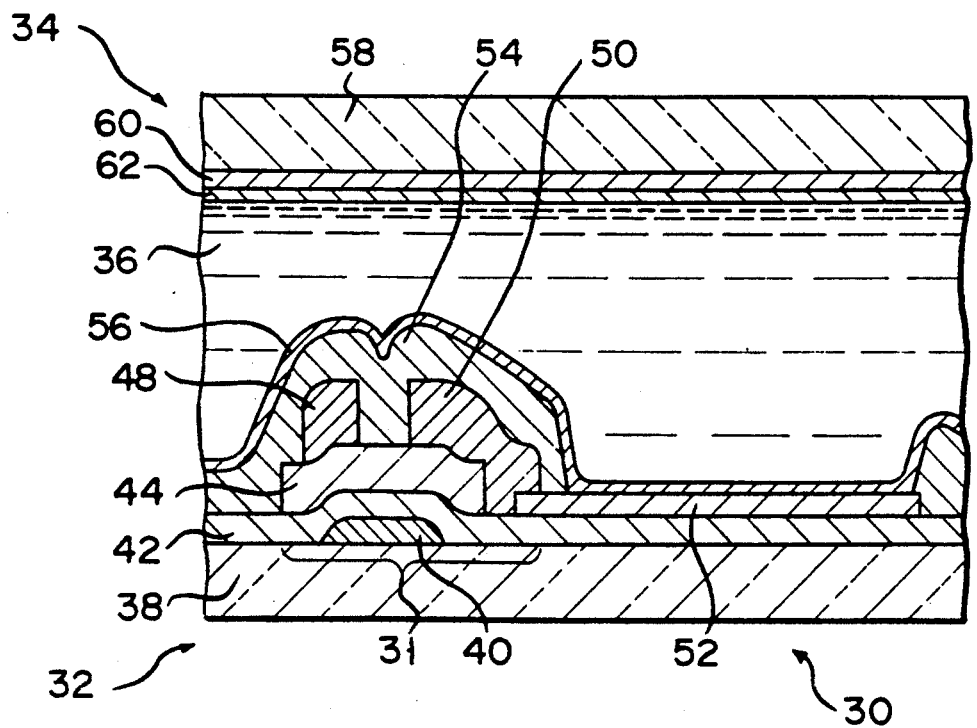
FIG. 2 is a cross-sectional view showing a liquid crystal device according to the first embodiment of the present invention.

FIG. 2 shows part of a matrix TFT array constituting a liquid crystal display device according to an embodiment of the present invention. At a central area 30 of the matrix TFT array, a liquid crystal 36 is sealed between first and second substrates 32 and 34. In the first substrate 32, a large number of address lines (not shown) are formed, in a substantially parallel fashion, on a transparent substrate 38 made of, for example, glass. A large number of data lines (not shown) which are crossed with the address lines are provided with an insulating layer 42 formed therebetween. Gate electrodes 40 are formed integral with the address line at locations where data lines are provided over the corresponding gate lines. A semiconductor layer 44 is formed on the gate electrodes with the insulating layer 42 formed therebetween.

A drain electrode 48 and source electrode 50 are formed on the semiconductor layer 44 in an opposed relation, noting that drain electrode 48 is formed integral with the data line. In this way, a TFT element 31 is constituted, serving as a non-linear active element. A transparent pixel electrode 52 is formed on the insulating film 42 in a manner to be connected to the source electrode 50. The semiconductor layer 44, drain electrode 48 and source electrode 50 are covered with a protective film 54. Further, an orientation film 56 is formed over the whole surface of the resultant structure.

The second substrate 34 if formed opposite to the aforementioned first substrate 32. The second substrate 34 includes a transparent substrate 58 formed of, for example, glass, and transparent electrode 60 and orientation film 62 formed sequentially over the transparent substrate 58 in that order. In an LC display device for color display, a color filter, not shown, is formed between the substrate 58 and the transparent electrode 60.

The aforementioned TFT element 31 is provided by forming the gate electrode 40, insulating film 42, semiconductor layer 44 and drain and source electrodes 48 and 50 by repeating the film forming step and photo-etching step a plurality of times.

The central area 30 of the matrix TFT element is connected in an array shown in FIG. 3.

The outer end of each address line 40 in the central area 30 of the matrix TFT element is shorted by a common short-circuit line 70 and the outer end of each data line 48 is shorted by a common short-circuit line 72. Since these short-circuit lines 70 and 72 are shorted at each corner of the element, it is possible to prevent short-circuiting between the respective associated layers which results from static electricity involved.

Over the substrate 38, the address line 40 is formed integral with its outer end portion 74 used for signal supplying and its outer end portion 74' used for examining, as shown in FIGS. 3 and 4. The insulating film 42 is formed on that portion of the substrate where the end portions 74, 74' of the address line is not present. The data lines 48, the terminals 76, 76' the short-circuit lines 70, 72, and the terminals 78, 78' connected to the short-circuit lines 70 and located over the address lines 40 are all formed, as an integral unit, using the same material. In this case, the terminal 74 of the address line 40 is connected to the terminal 78 of the short-circuit line 70 via a through-hole 80 which is formed in the insulating layer 42.

The aforementioned manufacturing process is effected in connection with the following steps. That is, the short-circuitg line 70 connected to the respective address line 40 and short-circuit line 72 connected to the respective data line 48 are formed and, at the same time, a short-circuit formation area 82 is formed in the neighborhood of a corner area where the short-circuit line 70 is connected to the short-circuit line 72. At the time of forming the address lines 40, as shown in FIGS. 3 and 5, a short-circuit electrode 84 and a connection area 86 connected to one end of the short-circuit electrode 84 are formed on the substrate 38, the short-circuit electrode 84 and connection electrode 86 being formed of the same material as that of the address line 40. The insulating film 42 is formed over the short-circuit electrode 84. Then a short-circuit electrode 88 and connection electrode 90 are formed over the substrate 38 when the data line 48 is formed and, in this case, the electrode 88 and connection electrode 90 are formed of the same material as that of the data line 48. The short-circuit electrode 88 is connected to the short-circuit line 70 and the connection electrode 90 is connected to the short-circuit line 70 such that it is located over the connection electrode 86. The connection electrode 86 is connected by a through-hole 94 to the connection area 90 which is located over the connection electrode 86 with the insulating film 42 formed. At the area 82, the short-circuit electrode 84 connected to the short-circuit line 70 on the side of the address line 40 is located in an opposing relation to the short-circuit electrode 88 connected to the short-circuit line 72 on the side of the data line 48, the short-circuit electrode 84 being nonconductively formed relative to the short-circuit electrode 88 at the area 82 with the insulating film 42 formed therebetween.

The TFT array is thus formed by the aforementioned method. In this case, the respective address lines 40 and data lines 48 are arranged in an interdigital fashion as shown in FIG. 6. Stated in another way, the address lines 40 and data lines 48 are respectively connected to the corresponding short-circuit lines 70 and 72 in an alternate fashion, that is, in a fashion divided into odd- and even-numbered lines.

The way for performing an electrical measurement will be explained below.

The TFT array as shown in FIG. 6 is locally exposed to a laser beam to cut a corner area at an array of the short-circuit lines 70 and 72. Let it be assumed that the four sides of the array of the short-circuit lines 70 and 72 are called a, b, c and d, respectively. Let it also be assumed that the corresponding ends located in an opposing relation to the four sides a, b, c and d of the array are called a', b', c' and d', respectively. When, in this case, broken lines are to be checked, electrical examination is made across a—a', b—b', c—c' and d—d' for the address lines 40 and the data lines 48. Upon examination for short-circuiting between the asociated layers, it is done across a–c, a–d, b–c and b–d. In this way, checking can be made for a connection breakage and/or short-circuiting between the associated layers.

After the completion of the aforementioned examination, the short-circuit lines 70, 72 are short-circuited again. In the area 82 at each corner where the short-circuit lines 70, 72 are arranged adjacent each other, the short-circuit electrodes 84, 88 one at each surface of the insulating film 42 are locally exposed to a laser beam, and the electrodes 84, 88 are electrically connected. A connection resistance across the electrodes 84 and 88 reveals a better value of the order of a few ohms through a few hundreds of ohms upon measurement. When the TFT array is placed in this state, a countermeasure can be made against static electricity.

When the LC display device is finally assembled, the respective short-circuit lines 70, 72 in the TFT array are cut along a broken line 92 according to the present embodiment.

A second embodiment of the present invention will be explained below.

FIG. 8 is a partial plan veiw showing an LC display device equipped with a matrix TFT array. The arrangement of the present embodiment is similar to the first embodiment except for added areas. In the second embodiment, the same reference numerals are employed to designate a part or an element corresponding to that in the first embodiment of the present invention. The second embodiment of the present invention is different from the preceding first embodiment in that two areas 82 and 82a are provided in the second embodiment in place of providing the short-circuit formation area 82 only at each corner of the short-circuit lines 70, 72.

A method for manufacturing an LC display device according to the second embodiment will be explained below.

At the stage of completing an array substrate, a connection area A of short-circuit lines 70, 72 at each corner of a substrate is cut off and, in this state, examination is made in the same way as in the aforementioned embodiment. Upon the completion of electrical checking, an area 82 to be made short-circuit at each corner is exposed to a laser beam, short-circuiting the respective short-circuit lines 70, 72. The resultant array substrate is transferred to an LC cell assembly process. After the completion of an orientation film coating step and rubbing step in that LC cell assembly process, a connection area B of the short-circuit lines 70, 72 at each corner is cut off the rest of the structure by a laser beam. Electrical examination is again made in that state. After the electrical examination, an area 82a to be made short-circuit is exposed to a laser beam, short-circuiting the short-circuit lines 70, 72. Then a cell sealing step, a liquid crystal filling step and a polarizing-plate attaching step are performed to complete a cell structure. The short-circuit lines 70, 72 are cut upon the assembly of the array substrate.

In the second embodiment, upon the completion of the array substrate and upon the completion of the rubbing step, the short-circuit line is opened by a laser beam and a short-circuit formation area is short-circuited by the laser beam. Upon the completion of the cell, it is proved effective to short-circuit or open-circuit the short-circuit lines by the laser beam even in the case where pixel defects are repaired with the use of the laser beam. In the present invention, one or two short-circuit formation areas are provided at each corner of the array of the short-circuit lines 70, 72, but the present invention is not restricted thereto. Three or more short-circuit areas can be provided at each corner of the array of the short-circuit lines 70, 72 as the case may be.

A third embodiment of the present invention will be explained below with reference to FIGS. 9 to 13.

In the same way as in the first embodiment, the LC display device is of such a type that an active element is located at a crosspoint where each of a plurality of address lines intersects with a corresponding one of a plurality of data lines over a substrate. The third embodiment is different from the first embodiment in that it is possible according to the third embodiment to short-circuit respective address lines and data lines and to use an examination method by which examination can be made for connection breakage and/or for a short-circuit between associated layers.

Figure 9:
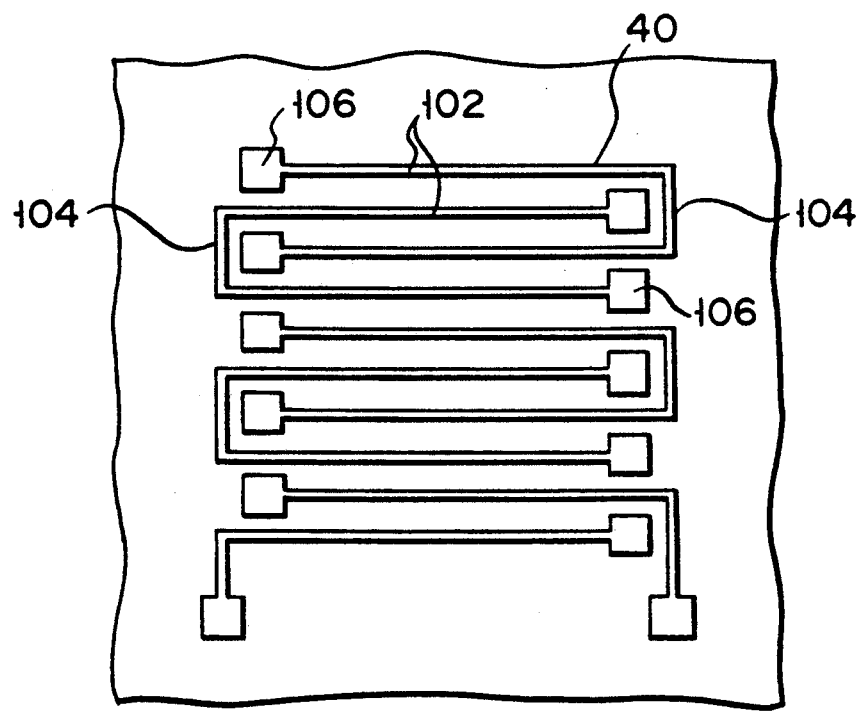
FIGS. 9 to 11 are an explanatory view for explaining a process for manufacturing a liquid crystal display device according to a third embodiment of the present invention.
Figure 10:
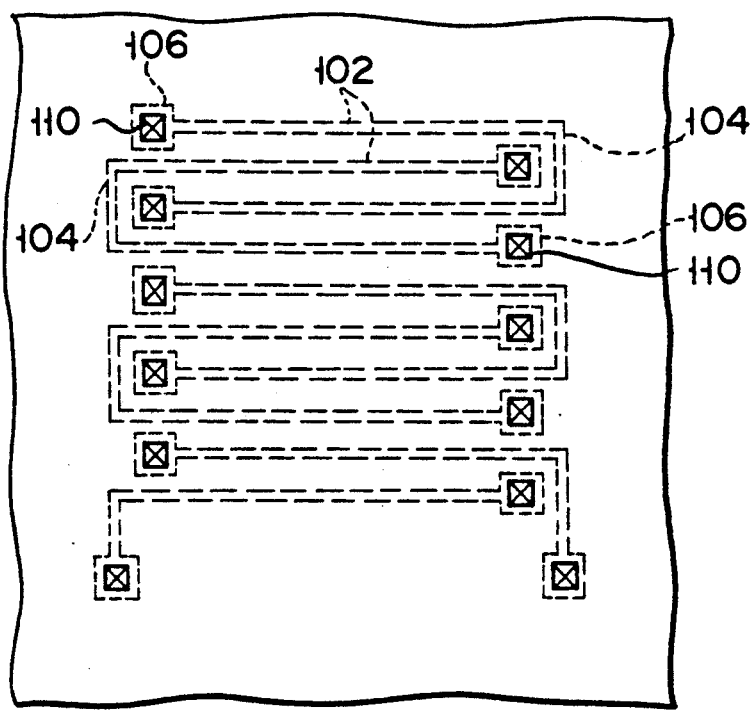

In an arrangement shown in FIG. 9, respective address lines 40 are formed over a substrate in which case the address lines correspond to signal wiring layers in a row direction, that is, to signal wiring layers in a horizontal direction in a paper plane (drawing sheet). The address lines 40 are comprised of a greater number of linear sections 102 and connection sites 104. The linear sections 102 are all of equal length and are arranged in a parallel fashion. The connection sites 104 are connected to the ends of the alternate linear sections 102. The two adjacent connection sites 104 which are connected to the alternate linear sections 102 are connected to the alternately opposite ends. As a result, the address lines 40 are formed as a plurality of substantially U-shaped configurations with the two adjacent U-shape areas formed in an interdigital fashion. A terminal 106 is provided at the end of the respective address line 40. As shown in FIG. 10, an insulating film 108 is coated over the substrate on which the address line 40 is formed. A contact-through-hole 110 is opened at the terminal 106 of the respective address line 40.

Figure 11:
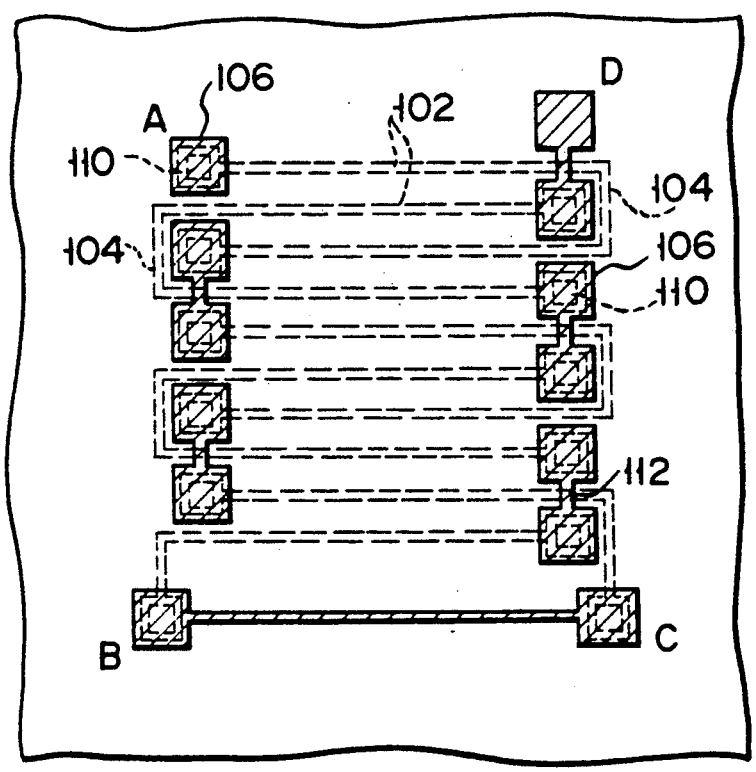

The data lines, not shown, which correspond to signal wiring layers in a column direction (in a vertical direction in a paper sheet) are formed over the insulating film 108 in a manner to intersect with the linear section 102 of the address lines 40. As shown in FIG. 11, upon the formation of data lines, not shown, a plurality of short-circuit lines 112 are provided each between the two terminals of the adjacent odd- and even-numbered address lines 40 as counted from the end of the address line 40. By so doing, the short-circuit 112 is connected between the odd- and even-numbered terminals 106 and the adjacent odd- and even-numbered terminals 106 are connected respectively in a series array.

In this state, a resistance value is measured across electrode pads A and D of the terminals which are located at both the ends of the series-connected address lines 40. By so doing, check is made for a connection breakage between the associated ones of all the wiring layers.

Figure 12:
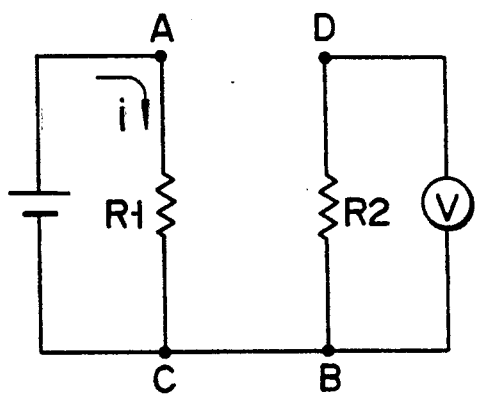
FIG. 12 shows an equivalent circuit of FIG. 11 in which case there is no short-circuiting error.
Figure 13:
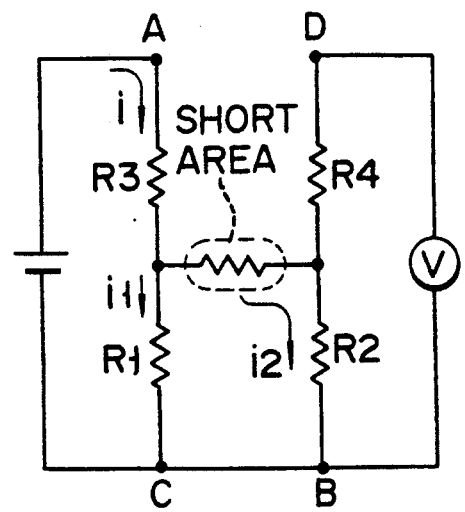
FIG. 13 shows an equivalent circuit of FIG. 11 in which case there is a short-circuiting error.

Then check is made for short-circuiting between the associated wiring layers. FIG. 12 shows an equivalent circuit when the associated address lines 40 in FIG. 11 are not short-circuited. Even if, in this case, a constant current i flows across electrode pads A and C, no voltage is detected between electrode pads B and D. If, on the other hand, the associated gate lines are short-circuited, a voltage variation appears between the electrode pads B and D. If, in a short-circuited state, a constant current i flows across the electrical pads A and C as shown in FIG. 13, branched currents $i_1$ and $i_2$ flow relative to the short-circuited spot, a voltage $V = i_2 \cdot R_2$ is detected across the electrode pads B and D. It is, thus, possible to make a ready check for a short-circuit error between the associated wiring layers.

After such a check, the short-circuited spot between the respective address line and the respective data line is removed from the rest of the structure upon the assembly of an LC display device.

Although the address lines 40 have been explained as being signal lines in the row direction, the same thing can also be said of the data lines which are used as signal lines in the column direction. In this case, the address and data lines may be electrically connected so as to prevent a dielectric breakdown resulting from static electricity. If the odd- and even-numbered address and data lines are connected in series array, it is possible to examine all the address lines and data lines, as a single line, respectively.

What is claimed is:

1. A method for manufacturing a liquid crystal display device, comprising the steps of:
   (a) forming a plurality of address lines and a plurality of data lines, in an intersecting fashion, over a first substrate;
   (b) forming at least on short-circuit line for short-circuiting the address and data lines;
   (c) forming at least one area to be made short-circuit having two short-circuit electrodes connected to the short-circuit lines of the address and data lines, the two short-circuit electrodes being located opposite to each other with an insulating film formed therebetween;
   (d) exposing, subsequent to forming the short-circuit line, a spot between the short-circuit lines of the address and data lines to a laser beam and cutting the short-circuit line;
   (e) examining, subsequent to the exposing and cutting step (d), the presence or absence of a connection breakage and that of short-circuiting;
   (f) subsequent to the step (e), exposing the area to be made short-circuit to a laser beam to make short-circuiting between the two short-circuit electrodes;
   (g) forming a electrode on a second substrate;
   (h) sealing a liquid crystal composition between the first and second substrate; and
   (i) subsequent to making a short-circuit between the two short-circuit electrodes but prior to completing the liquid crystal display element, cutting off the short-circuit electrodes.

2. The method according to claim 1, wherein said area to be made short-circuit is formed in the neighborhoods of corners where the short-circuit line of said address line is connected to that of said data line.

3. A method for manufacturing a liquid crystal display device, comprising the steps of:
   (a) forming a plurality of address lines and a plurality of data lines in an intersecting fashion over a first substrate;
   (b) forming a short-circuit line for short-circuiting the address and data lines;
   (c) forming at least two area to be made short-circuit having two short-circuit electrodes connected to the short-circuit lines of the address and data lines at the neighborhoods of corners, the two short-circuit electrodes being located opposite to each other with an insulating film formed therebetween;
   (d) exposing, subsequent to the step (b), a spot between the short-circuit lines of the address and data lines to a laser beam and cutting the short-circuit line;

(e) examining, subsequent to the exposing and cutting step, the presence or absence of a connection breakage and that of short-circuiting;

(f) subsequent to the examining step, exposing one area to be made short-circuit to a laser beam to cause short-circuiting between the two associated electrodes;

(g) subsequent to coating an orientation film on the first substrate, and performing a rubbing step, the two associated short-circuit electrodes be exposed to a laser beam to cut the short-circuit line;

(h) subsequent to the cutting step (g), making examination for a connection breakage and short-circuiring between the address and data lines;

(i) subsequent to the examining step (h), exposing the other area to be made short-circuit to a laser beam to again performing short-circuiting between the two short-circuit electrodes;

(j) forming a electrode on a second substrate;

(k) assembling a liquid crystal cell;

(l) sealing a liquid crystal composition between the first and second substrates; and (m) subsequent to the short-circuiting step (i) but prior to completing the liquid crystal display device, cutting off the short-circuit electrodes.

4. A method for manufacturing a liquid crystal display device comprising the steps of:

(a) forming a plurality of address lines and a plurality of data lines, in an intersecting fashion, over a first substrate;

(b) examining the presence or absence of a connection breakage within the address and data lines, and that of short-circuiting between the address and data lines;

(c) forming a electrode on a second substrate;

(d) sealing a liquid crystal composition between the first and second substrates, and wherein, (e) subsequent to the step (a), said address and data lines are, each, formed of a U-shape with the two adjacent lines arranged in an interdigital fashion; and, (f) forming a plurality of short-circuit lines in a manner to have the plurality of address lines connected in a single array.

5. The method according to claim 4, wherein, in said step (f), n-th and (n+2)-th address lines which are counted from an end are connected by a short-circuit line to each other, where n=a natural number.

6. A method for manufacturing a liquid crystal display device, comprising the steps of:

(a) forming a plurality of address lines and a plurality of data lines, in an intersecting fashion, over a first substrate;

(b) examining the presence or absence of a connection breakage within the address and data lines, and that of short-circuiting between the address and data lines;

(c) forming a electrode over a second substrate; and (d) sealing a liquid crystal composition between the first and second substrate, wherein, (e) in said step (a), said gate and data lines are so formed as to have a U-shape, each, with the respective U-shaped address and data lines arranged in an interdigital fashion; and (f) a plurality of short-circuit lines are so provided as to be connected as a single array.

7. The method according to claim 6, wherein, in said step (f), n-th and (n+2)-th address lines which are counted from an end are connected as a single array to each other wherein n=a natural number, and the address and data lines are connected by a corresponding short-circuit line to each other to provide a single line array.

* * * * *